L. T. WEISS.
SPINDLE FOR THE EJECTORS OF LINOLEUM MACHINES.
APPLICATION FILED JULY 8, 1916.
1,217,248.
Patented Feb. 27, 1917.
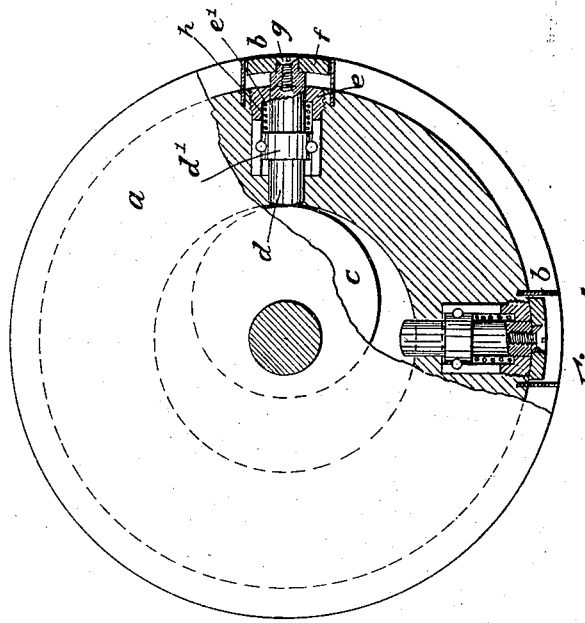
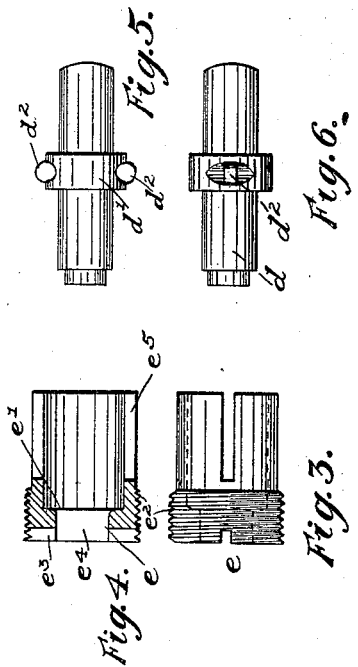
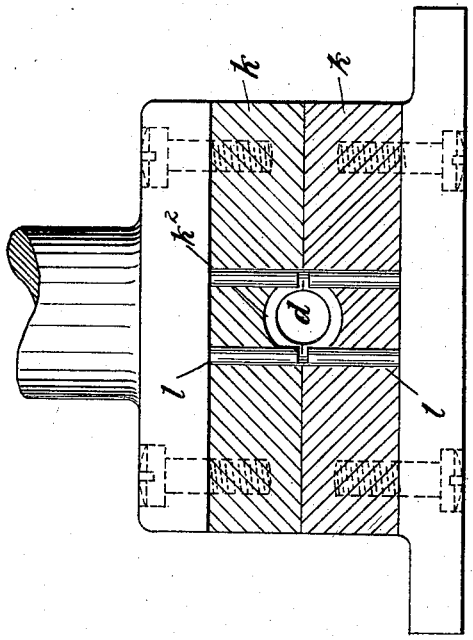
Witnesses.
Inventor
Louis T. Weiss
Attorney

UNITED STATES PATENT OFFICE.

LOUIS T. WEISS, OF BROOKLYN, NEW YORK.

SPINDLE FOR THE EJECTORS OF LINOLEUM-MACHINES.

1,217,248.  Specification of Letters Patent.  Patented Feb. 27, 1917.

Application filed July 8, 1916. Serial No. 108,117.

*To all whom it may concern:*

Be it known that I, LOUIS T. WEISS, a citizen of the United States, and a resident of the borough of Brooklyn of the city of New York, in the State of New York, have invented certain new and useful Improvements in Spindles for the Ejectors of Linoleum-Machines, of which the following is a specification, reference being had to the accompanying drawings, forming a part hereof.

This invention relates to spindles for the ejectors used on the rolls of linoleum machines and has for its object to improve the construction of such spindles by making them integral throughout, and reduce the cost of manufacture thereof appreciably by forming the guiding lugs thereon in a single stamping operation and out of the metal of the spindle itself. Heretofore, spindles employed for the ejectors of linoleum machines have been machined to form and have then had secured therein diametrically opposed guide pins, the cost of manufacture of which coupled with the cost of assembling has been disproportionate to the cost of the ejectors. In addition to the special machining operations referred to above, it was necessary to drill holes of small diameter with extreme accuracy in the spindles since these holes had to receive the independent guide pins with a driving fit and hold them firmly in proper relation to one another and to the guide slots. In accordance with the present invention, the many machining operations described above are eliminated and the improved spindle after having been given its usual form, has the required guide lugs struck up from the metal thereof by suitable dies, and in a single stamping operation. The lugs thus formed are necessarily disposed in the desired relationship to one another and to the spindle and, being integral with the spindle, maintain this desired relationship and can never be loosened on the spindle as has been the case heretofore. The many advantages of the improved spindle will appear with greater particularity hereinafter in connection with the detailed description of the accompanying drawings, in which—

Figure 1 is a somewhat conventional view of so much of a linoleum machine as is necessary for an understanding of the application of the improved spindle thereto.

Fig. 2 is a fragmentary detail view, partly in section, showing suitable dies for stamping the lugs up from the metal of the spindle to produce the improved spindle.

Fig. 3 is a detail view of the guide bushing for the spindle.

Fig. 4 is a sectional view of the bushing shown in Fig. 3.

Fig. 5 is a detail view of the improved spindle showing the diametrically opposed lugs thereon.

Fig. 6 is a further detail view of the spindle shown in Fig. 5, the spindle having been turned through an angle of 90°.

The improved spindle forming the subject matter of this invention is employed as an element of the ejector device for linoleum machines, these machines including an ejector roll $a$ in which are mounted hundreds of the ejector devices, represented generally at $b$, and these ejector devices are operated periodically to effect the desired ejection of the pieces of plastic material, by a fixed master cam $c$ with the periphery of which the spindles $d$ of the ejectors engage upon rotation of the roll $a$, all in a manner well known. The ejectors for the plastic material are generally of substantially the character illustrated in the drawings, including a supporting bushing $e$ threaded radially into the roll $a$, the spindle $d$ slidably mounted in the bushing and carrying at its outer end the ejector plate $f$ secured detachably to the plunger by a screw $g$, and a spiral spring $h$ operatively interposed between a shoulder $e'$ in the bushing and an annular boss $d'$ formed on the spindle $d$, this spring serving normally to hold the ejector in retracted position. The improved features of the invention will be described particularly with reference to Figs. 3–6 in which are illustrated in some detail the improved spindle and the supporting and guiding bushing therefor, the relationship between which has given rise to the present improvements. The bushing $e$ is threaded, as at $e^2$, to permit its ready insertion in the periphery of the roll $a$, and has at its outer end a transverse slot $e^3$ to receive a suitable tool, such as a screw driver, to facilitate its insertion and removal. Through this outer end there is also formed a relatively contracted opening $e^4$ to receive snugly the spindle $d$ and guide the same in its reciprocating movements. The mean diameter of the bushing $e$ is such as to receive snugly the annular boss $d'$ of the spindle $d$ so that the engagement of this boss with the bushing serves further to guide the spindle in a truly axial movement. Between the inner shoulder $e'$ at the end of the bushing $e$ and the annular boss $d'$, may be inserted conveniently the spiral spring $h$ to force the spindle normally to a position in which the ejecting plate $f$ is retracted. To prevent rotative movement of the spindle $d$ in the bushing $e$ and further guide the spindle in its reciprocations, the bushing is formed with two diametrically opposed longitudinally extending guide slots $e^5$ in which rest lugs $d^2$ formed in the spindle $d$ in such a manner as to create, as a new article of manufacture, the improved spindle. Heretofore, it has been the common practice to drill holes in the spindle, machine suitable guide pins, and drive these pins in the holes for engagement with the guide slots $e^5$ in the bushing. The relatively small size of the holes and the pins made this machine work very tedious and costly and required the greatest degree of accuracy, since it was necessary that the pins be inserted so as to be held permanently in engagement with the spindle and maintain with absolute accuracy their relative disposition with regard to one another and to the guide slots $e^5$. By the present invention, these costly machining and assembling operations are eliminated, and a spindle is formed which is integral throughout, more durable in use and provided with suitable guiding lugs $d^2$ of the required form and disposition, in a single stamping operation. To produce the lugs $d^2$, suitable, similar die members $k$, $k'$, are formed to receive the spindle $d$ in its machined condition and these die members are provided with opposed studs or projections $l$ arranged in pairs at opposite sides of the cavity $k^2$, in which the annular boss $d'$ rests and having their respective axes alined and extending tangentially to the annular boss at diametrically opposed points thereof. In forming the lugs $d^2$, the machined spindle $d$ is placed in the lower die member $k'$ with the annular boss $d'$ in the cavity $k^2$ to insure absolute centering thereof, and the upper die member $k$ is then forced downward in the usual manner to bring the opposed pairs of studs $l$ toward one another and thereby strike up the lugs $d^2$ from the metal in the annular boss $d'$ at diametrically opposed points. In this operation, the ends of the studs $l$ pass into the metal of the boss $d'$ and cut it and squeeze it simultaneously so as to pinch out the lugs $d^2$. It will be observed that the width of these lugs $d^2$ as determined by the final spaced relationship between the oppositely disposed studs $l$ after the die members have been brought together is such that the lugs will be received snugly by the slots $e^5$ in the bushing $e$.

A further advantage of the improved spindle resides in the formation of lugs with large flat bearing surfaces on opposite sides for engagement with the sides of the slots $e^5$, whereby the wearing quality and accurate and smooth working of the spindle in the slots is assured. Heretofore, the guide pins employed were cylindrical so that they bore against the sides of the slots and tangential points only and these points were subjected to wear and rapidly lost snug engagement with the sides of the slots and became weakened. This wear formerly has always resulted in permitting axial play of the spindle to a point where its function became destroyed.

The improved spindle shown in Figs. 5 and 6, it will now be understood, embodies, as a new article of manufacture, all of the commercial requirements of a cheap, simple and durable element capable of being readily produced in large quantities with unskilled labor by the stamping operation described.

The scope of the invention will appear in the appended claims.

I claim as my invention:

1. As an article of manufacture a guide member having integral lugs struck up from its periphery and extending beyond and within its body.

2. As an article of manufacture a guide member having an enlargement and lugs extending beyond and within the body of said enlargement.

3. A guide member having an enlargement and integral lugs struck up from its periphery and extending beyond and within the body of said enlargement.

This specification signed this 6th day of July, A. D. 1916.

LOUIS T. WEISS.